United States Patent

Naert

[11] Patent Number: 6,073,991
[45] Date of Patent: Jun. 13, 2000

[54] STRESS-BEARING ASSEMBLY

[75] Inventor: Michel Naert, Västra Frölunda, Sweden

[73] Assignee: AB Volvo, Sweden

[21] Appl. No.: 08/817,633

[22] PCT Filed: Oct. 25, 1995

[86] PCT No.: PCT/SE95/01192

§ 371 Date: Apr. 24, 1997

§ 102(e) Date: Apr. 24, 1997

[87] PCT Pub. No.: WO96/12638

PCT Pub. Date: May 2, 1996

[30] Foreign Application Priority Data

Oct. 25, 1994 [SE] Sweden .................................. 9403659

[51] Int. Cl.[7] ........................................................ B60J 7/00
[52] U.S. Cl. ...................... 296/197; 296/203.01; 296/901
[58] Field of Search .................................... 296/187, 193, 296/197, 203.01, 203.03, 204, 205, 900, 901

[56] References Cited

U.S. PATENT DOCUMENTS 5,150,944  9/1992  Yoshida et al. ..................... 296/203.01
5,213,386  5/1993  Janotik et al. ................. 296/203.01 X

FOREIGN PATENT DOCUMENTS

| 594 131 | 4/1994 | European Pat. Off. . |
| 2 687 974 | 9/1993 | France . |
| 22 11 185 | 9/1972 | Germany . |
| 326 894 | 8/1970 | Sweden . |
| 2 196 584 | 5/1988 | United Kingdom . |
| 91/17877 | 11/1991 | WIPO . |

*Primary Examiner*—Joseph D. Pape
*Attorney, Agent, or Firm*—Lerner, David, Littenberg, Krumholz & Mentlik, LLP

[57] ABSTRACT

A stress-bearing assembly is for use in a vehicle body. The assembly includes a composite laminate resin-cured structure comprising at least a pair of oriented fiber mats separated by a layer of foamed plastic and at least one closed loop structure attached to the composite structure. The mats preferably comprise glass fibers, carbon fibers or fabric material, and the composite structure preferably constitutes the floor structure of a vehicle.

13 Claims, 3 Drawing Sheets

STRESS-BEARING ASSEMBLY

FIELD OF THE INVENTION

The present invention relates to a stress-bearing assembly for use in a vehicle body.

BACKGROUND OF THE INVENTION

It is a common goal within the motor industry to reduce the weight of vehicles in order to permit more fuel-efficient engines to be used, while at the same time maintaining acceptable performance standards.

The majority of passenger vehicles currently in production have bodies which are manufactured from steel. Steel is an attractive material since it is relatively easy to form into complicated shapes, and components and panels made of such material can be easily joined by welding. In addition, pressed steel panels can be painted to provide an excellent surface finish. The ability to shape and join steel components implies that a vehicle body can be designed to provide the desired degree of stiffness and, importantly, progressive collapsibility in the vent of an accident. A major disadvantage with still is, however, its weight.

As an alternative to steel, aluminum has been used in certain vehicle body constructions for many years, primarily as low stressed body panels. More recently, vehicles have been produced comprising a space frame of interconnected aluminum members to which aluminum panels are attached. Aluminum, however, suffers from the disadvantages that it is relatively difficult to join together and that it is comparatively expensive.

Vehicle bodies made from composite materials such as glass fiber reinforced plastic are well know. These composite bodies have a low stress-bearing capability and vehicles equipped with such a body must therefore also employ a chassis which supports the running gear.

A stress-bearing composite structure for use as a vehicle platform is described in Swedish Patent No. 326,894. The structure is said to consist of a closed hollow body made up of a pair of joined-together shells, with the body being filled with a hard foamed plastic. In order to impart sufficient strength to the structure in desired regions, the density of the foamed plastic is increased.

A composite chassis subframe structure is disclosed in European Patent No. 594,131 in which a foam core is sandwiched between reinforcing fiber preforms and is further wrapped with additional reinforcing fiber cloth. Steel inserts for attaching suspension and other chassis components are also wrapped and retained to the foam core. The sandwiched and wrapped foam core is then placed in a mold and plastic resin is injected, thereby impregnating the fibers.

Magnesium has been used for many years in the automobile industry, particularly for small components, though until recently its light-weight advantages were offset by the inability to overcome its susceptibility to corrosion.

In order to rationalize production of motor vehicles, it is highly desirable to be able to make use of standardized components, i.e. as many common components as possible are used in different models.

In view of the above, the present inventor has identified a need for a stress-bearing assembly which can be used in vehicle body constructions which is lighter than conventional assemblies while at the same time still providing adequate stiffness, and which assembly may easily be adapted to different models of vehicles.

SUMMARY OF THE INVENTION

In accordance with the present invention, these and other objects have now been realized by the invention of a stress-bearing assembly for use in a vehicle body, the assembly comprising a composite laminate resin-cured structure comprising at least one pair of fiber mats separated by a layer of foamed plastic and at least one closed loop structure attached to the composite structure, the closed loop structure comprising a generally inverted U-shaped hoop member and a transversely extending member closing the hoop member to form the closed loop structure. In a preferred embodiment, the at least one pair of fiber mats comprises material such as glass fibers, carbon fibers or fabric. In a preferred embodiment, the composite structure constitutes a floor structure of a vehicle.

In accordance with another embodiment of the stress-bearing assembly of the present invention, the at least one closed loop structure comprises at least two of the closed loop structures comprising magnesium and serving as a portion of a vehicle passenger compartment. In a preferred embodiment, the stress-bearing assembly further includes a roof panel comprising a composite laminate resin-cured panel comprising at least one pair of oriented fiber mats separated by a layer of foamed plastic extending over and between the at least two closed loop structures.

In accordance with another embodiment of the stress-bearing assembly of the present invention, the assembly further includes a door structure supported by the closed loop structures, the door structure comprising an inner frame comprising magnesium and an outer panel, the door structure forming a portion of a passenger compartment. In a preferred embodiment, the outer panel of the door structure comprises a composite comprising an inner layer of fiber-reinforced plastic and an outer layer of metal foil bonded to the inner layer. Preferably, the outer layer of metal foil comprises a metal such as steel or aluminum.

In accordance with another embodiment of the stress-bearing assembly of the present invention, the assembly further includes a body panel supported by the stress-bearing assembly, the body panel comprising a sheet of metal, and a liner of fiber-reinforced plastic attached to the sheet of metal at discrete points, the liner serving as both a strengthening element and a sound absorbing element.

In accordance with another embodiment of the stress-bearing assembly of the present invention, the assembly further includes a suspension assembly supported by the stress-bearing assembly, the suspension assembly comprising a subframe and a generally omega-shaped composite spring and wheel location member. Preferably, the spring and wheel location member is pivotably attached to the subframe at a pair of pivot locations, each of the pair of pivot locations being immediately adjacent to a front wheel. In a preferred embodiment, the spring and wheel location member is resiliently supported by the subframe at at least one location substantially equidistant from the pair of pivot locations.

In accordance with another embodiment of the stress-bearing assembly of the present invention, the assembly further includes a rear suspension assembly supported by the stress-bearing assembly, the rear suspension assembly comprising a composite spring and wheel location member.

The objects of the present invention are met by providing a stress-bearing assembly for use in a vehicle body, the assembly comprising a composite laminate resin-cured structure made up of at least one pair of fiber mats separated by a layer of foamed plastic, and at least one closed loop structure attached to the composite structure, the closed loop structure being in the form of a generally inverted U-shaped member closed by a transversely extending bar or plate member.

Preferably, the composite structure which forms a part of the stress-bearing assembly constitutes the floor structure of a vehicle. In such applications, the stress-bearing assembly may be used as a carrier for a number of different vehicle body components.

BRIEF DESCRIPTION OF THE DRAWINGS

The invention will now be described in greater detail in the following by way of example only and with reference to the following detailed description, which, in turn, refers to the attached drawings, in which.

DETAILED DESCRIPTION

Figure 1:
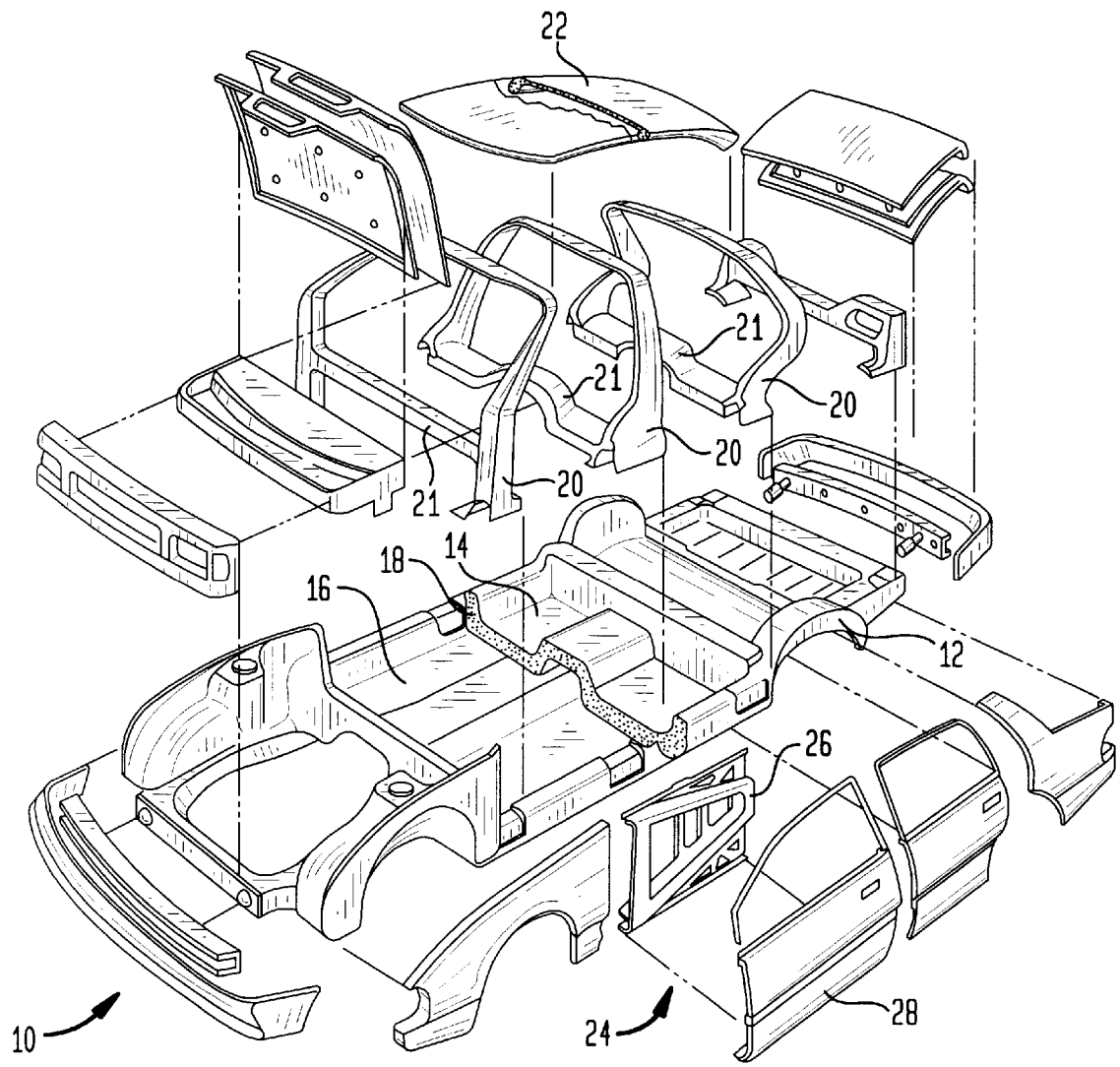
FIG. 1 is a schematic, perspective, exploded view of a vehicle body construction comprising the stress-bearing assembly according to the present invention.
Figure 1A:
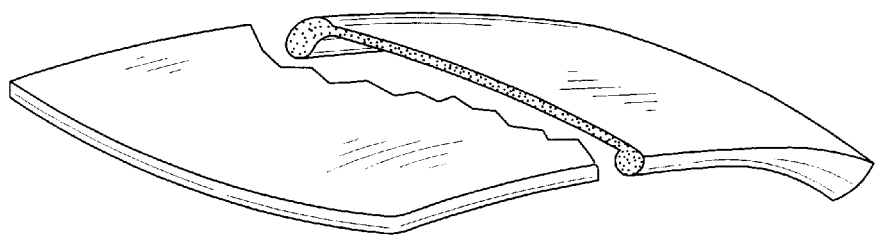

Referring to the Figures, in which like reference numerals refer to like elements thereof, in FIG. 1, reference numeral 10 generally denotes a vehicle body comprising a stress-bearing assembly according to the present invention. More particularly, the stress-bearing assembly comprises a composite laminate resin-cured structure 12 made up of at least one pair of fiber mats, 14 and 16, which may be oriented and which are separated by a layer of foamed plastics 18, and at least one closed loop structure 20 attached to the composite structure 12. The mats, 14 and 16, may comprise glass fibers, carbon fibers or fabric, and the composite structure is achieved by orienting the fibers in the mats, placing one mat in one mold half, the other mat in a second mold half, adding foamed plastics therebetween and injecting a matrix material into the mold. The invention is not restricted to the types of material involved, though such materials may include polyester or epoxy as the matrix material and polyurethane, polypropylene or polyester as the foamed plastics.

As is apparent from FIG. 1, the composite structure 12 constitutes the floor structure of a vehicle. General stiffness is imparted to the floor by molding the composite structure such that an enclosing box section of greater depth than the average thickness of the floor structure is provided around substantially the perimeter of the floor section. Where it is desired to provide local regions of greater stiffness in the composite structure 10, the thickness of the mats may be increased, for example by increasing the number of mats, or the density of the foamed plastic may be increased. Conceivably, metal reinforcing, for example in the form of steel plates or beams, may be incorporated in the composite structure.

Advantageously, the closed loop structure 20 is made up of magnesium and serves as a portion of the passenger compartment. The closed loop structure is in the form of a generally inverted U-shaped hoop which is closed by a transversely extending bar or plate member 21. The closed loop structure 20 may be squeeze-cast or vacuum molded as a hollow closed section or an open channel section or a combination of the two.

As shown in FIG. 1, the illustrated vehicle body construction comprises three closed loop structures serving as the A-post, B-post and C-post, respectively. As is apparent from FIG. 1, the transversely extending bar or plate member 21 of each loop structure may be located at different heights with respect to the floor structure 12. The actual height depends, among other things, on what forces the loop structure is to be subjected to. For example, in order to offer increased protection to the vehicle occupants in a side-impact collision, it may be advantageous to locate the transversely extending bar or plate member at a height of about 30 cm above the floor structure 12. Preferably, the closed loop structures are bonded to the floor structure 12 by adhesive.

The provision of a stress-bearing assembly as described above implies that a single model of floor structure 12 may be employed for a range of vehicles. For example, by selecting suitable positions for the closed loop structures 20, a two-door model and a four-door model can be built on identical floor structures. Furthermore, by providing a fourth closed loop section at the rear end of an identical floor structure, an estate car body can be built. Should a long wheel base version of a vehicle be desired, this can be achieved simply by dividing the floor structure at a location within the wheelbase and inserting a lengthening element.

Greater strength is imparted to the passenger compartment by linking adjacent closed loop structures in the roof region, for example by running bars from one loop structure to the next. Alternatively, a roof panel 22 made in the same manner as the floor structure 12 may be employed, which roof panel extends over and between the closed loop structures 20. Again, adhesive may be used to affix the roof panel to the closed loop structures. As with the floor structure 12, stiffness is imparted to the roof panel 22 by the provision of an integral box section extending around the perimeter of the roof panel. In this manner, an opening may be cut into the roof panel, for example for a sun-roof, without significantly affecting the stiffness of the panel.

In order to further increase the strength of the passenger compartment while still maintaining very low weight, the closed loop structures 20 are intended to support a plurality of door structures 24. To this end, each door structure preferably comprises an inner frame 26 made from magnesium and an outer panel 28, with the door structure forming a portion of the passenger compartment when the door structure is in a closed position. The inner frame 26 is adapted to carry ancillary items such as the door lock mechanism, window winding mechanism, door hinges, etc.

Figure 2:
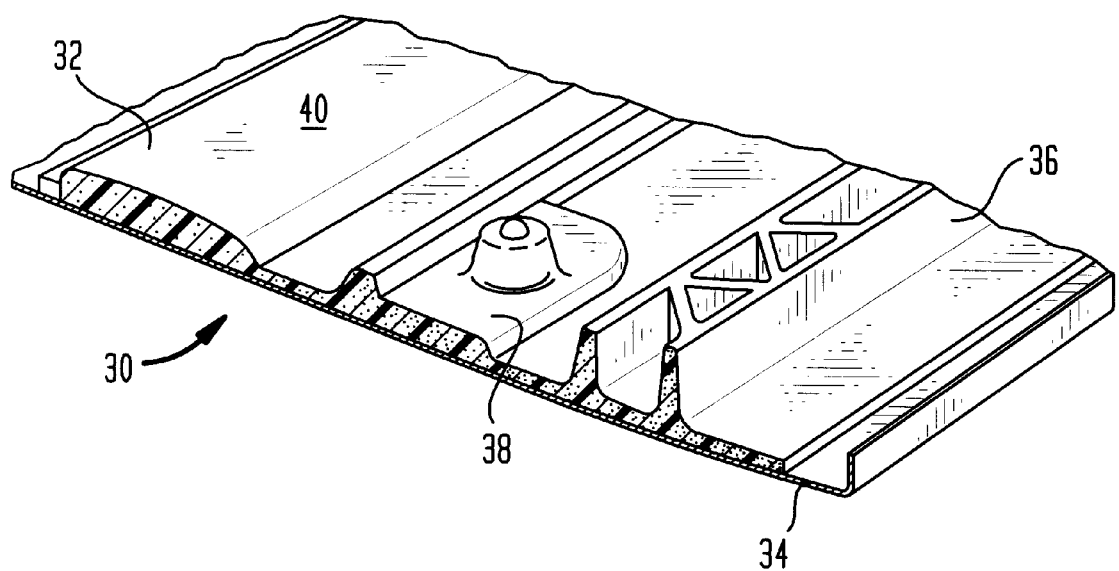
FIG. 2 is a schematic, perspective, sectional view through a section of a body panel which may be used in the vehicle body construction of FIG. 1.

As most clearly illustrated in FIG. 2, the outer panel 28 of the door structure advantageously comprises a composite 30 made up of an inner layer 32 of fiber-reinforced plastic bonded to an outer layer of metal foil 34. The inner layer of fiber-reinforced plastic, for example GMT, is molded so as to provide stiffening regions 36 and/or attachment regions 38. Where no reinforcement is needed, the fiber-reinforced plastic may be relatively porous to thereby provide a sound-absorbing function. Such a porous region is denoted by reference numeral 40 in FIG. 2. The inner layer 32 of fiber-reinforced plastic is bonded to the layer of metal foil 34 in a mold in which the foil is first laid, the fiber-reinforced plastic is then added and heated to a temperature at which it becomes formable, and thereafter the foil and fiber-reinforced plastic are pressed together. The layer of outer foil 34 is a metal such as steel or aluminum and is chosen so as to allow a high standard of external surface finish to be imparted on the door structure 24 to thereby permit the outer panel to be painted in a conventional manner.

The outer panel construction described above and illustrated in FIG. 2 may also be employed for the front and rear wings of the vehicle body.

Figure 3:
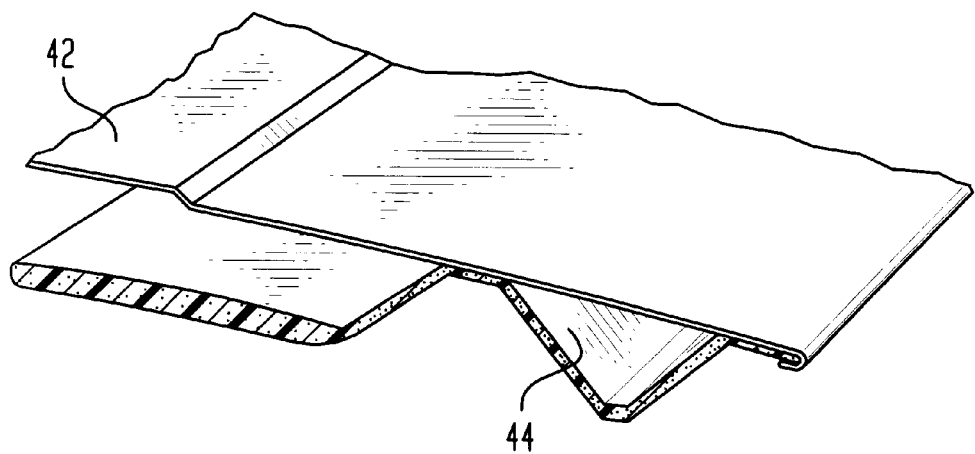
FIG. 3 is a schematic, perspective, sectional view through a section of a vehicle hood which may be used in the vehicle body construction of FIG. 1.

The demands placed on a vehicle hood, and to a somewhat lesser extent the trunk lid, are higher than those placed on other panels making up the vehicle body since the hood also plays a significant role in the impact absorption and dissipation of energy in a crash. In addition, the hood must also possess sound absorbing properties to mute the noise of the engine. With this in mind, the present invention comprises a hood construction as illustrated in FIG. 3. Thus, the hood comprises a sheet 42 of metal to which a liner 44 of fiber-reinforced plastic is attached at discrete points, the liner 44 serving both as a strengthening element and a sound absorbing element depending on the degree of density of the liner. Preferably, the metal sheet is made from aluminum or steel, while the fiber-reinforced plastic liner is GMT. As is apparent from FIG. 3, the liner 44 is made more dense in regions where reinforcement is required and less dense where sound absorbency is desired. Advantageously, the liner 44 is shaped so as to be distanced from the metal sheet 42 at all regions other than those where the liner and sheet are joined. Preferably, the liner and sheet are glued together.

In a further attempt to reduce the weight of a vehicle employing the body construction as has been described in the above, the present invention comprises suspension system which will be described in the following with reference to FIGS. 4 and 5.

Figure 4:
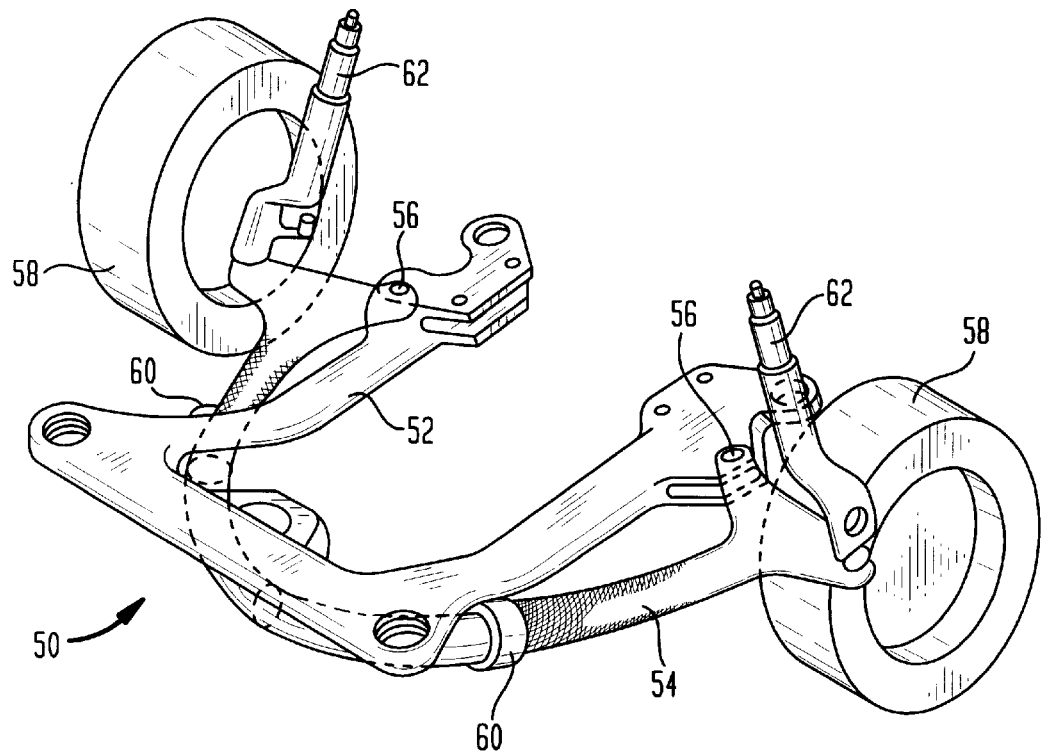
FIG. 4 is a schematic, perspective view of a front suspension subframe assembly which may be used in the vehicle body construction of FIG. 1.

In FIG. 4, reference numeral 50 generally denotes a front and/or rear suspension assembly comprising a subframe 52 and a generally omega-shaped composite combined spring and wheel location member 54. The subframe 52 may be fabricated from steel or cast in aluminum or magnesium. Alternatively, a fiber-reinforced plastic may be employed for both the subframe 52 and the combined spring and wheel location member 54. The combined spring and wheel location member is pivotally attached to the subframe at two pivot locations 56, each location being immediately adjacent a front wheel 58. The region of the member 54 extending between the pivot location 56 and the wheel 58 must be very stiff to ensure accurate and constant wheel alignment, while the portion of the member 54 which extends in a loop is made torsionally flexible, to thereby serve as the spring in the suspension assembly. The stiffness/flexibility properties of the combined spring and wheel location member 54 are attained by varying the orientation and thickness of the layers of fibers making up the composite structure. In this manner, the combined spring and wheel location member 54 can also be designed to function as an antiroll bar.

In order to allow the combined spring and wheel location member 54 to act as a spring, it is resiliently supported by the subframe 52 at at least one location substantially equidistant from the two pivot locations 56. In FIG. 4, two such resilient supports are illustrated and denoted by reference numeral 60. These resilient supports are preferably in the form of rubber bushes or the like.

To dampen the vertical movement of the combined spring and wheel location member 54 about the pivot locations 56, a pair of shock absorbers 62 are provided.

The entire suspension assembly 50 is designed to be mounted by means of the subframe 52 to the vehicle body construction illustrated in FIG. 1.

Figure 5:
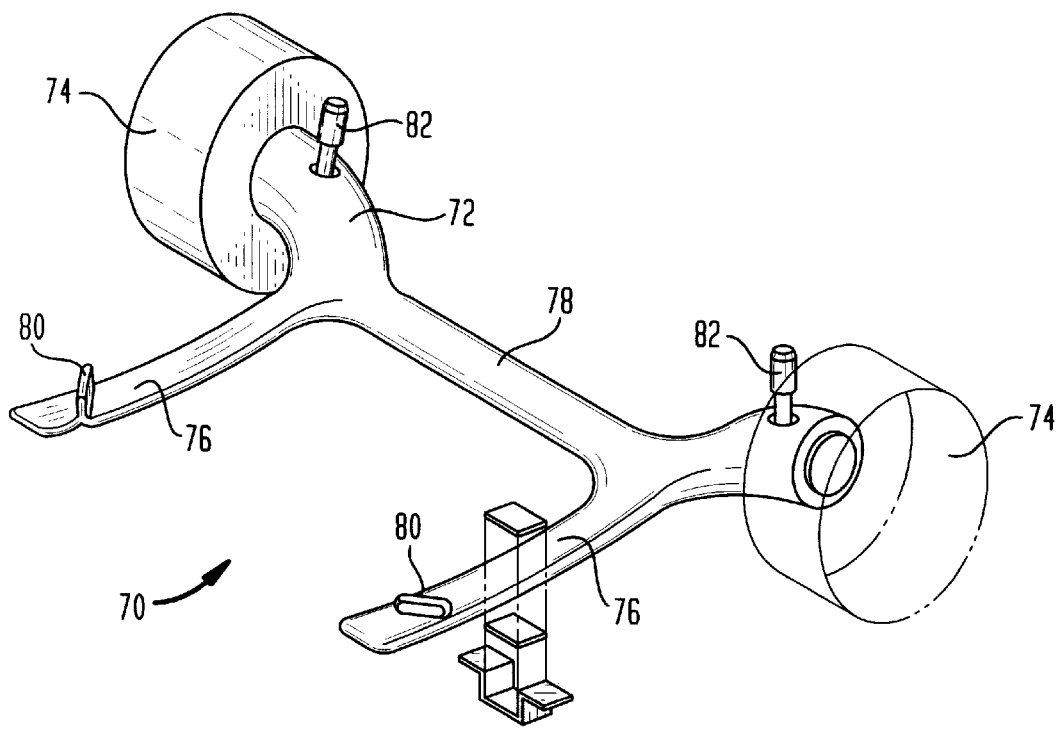
FIG. 5 is a schematic, perspective view of a rear suspension arrangement which may be used in the vehicle body construction of FIG. 1.

Another rear suspension assembly for use with the previously described vehicle body construction is illustrated in FIG. 5 and is generally denoted by reference numeral 70. As with the front suspension assembly, the rear assembly 70 comprises a composite combined spring and wheel location member, this time denoted 72. In the region of each wheel 74, the member 72 is generally annular. The combined spring and wheel location member comprises a pair of generally flat leaf members 76 which are intended to be affixed to the floor structure of the vehicle. The leaf members 76 are designed to impart characteristics to the combined spring and wheel location member 72. The degree of stiffness of the member 72 is varied such that it is high in the immediate vicinity of the wheels 74 and less so in the leaf members. In addition, antiroll characteristics can be imparted by carefully selecting the degree of stiffness in the region 78 of the member interconnecting the leaf springs. To allow for vertical displacement of the wheels with respect to the floor structure, this region 78 must be designed to permit torsional displacement. To effect this, the profile of the member is generally U-shaped and open in this region.

In order to impart desired handling characteristics to the vehicle to which this rear suspension may be fitted, the leaves 76 of the combined spring and wheel location member 72 may be provided with guide flanges 80 which are intended to cooperate with (not shown) guide channels on the vehicle chassis. By selecting appropriate bushings and clearances, self-steer characteristics which counter oversteer may be incorporated in the rear suspension assembly.

A pair of shock absorbers 82 are provided to dampen the vertical movement of the combined spring and wheel location member.

Although the various panels and suspension components have been described above in connection with a particular floor structure, it is to be understood that the various panels and components may be incorporated in vehicles having widely differing floor structures.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A stress-bearing assembly for use in a vehicle body, said assembly comprising a composite laminate resin-cured structure comprising at least one pair of fiber mats separated by a layer of foamed plastic, and at least one closed loop structure attached to said composite structure, said closed loop structure comprising a generally inverted U-shaped hoop member and a transversely extending member closing said hoop member to form said closed loop structure.

2. The stress-bearing assembly as claimed in claim 1 wherein said at least one pair of fiber mats comprise material selected from the group consisting of glass fibers, carbon fibers, and fabric.

3. The stress-bearing assembly as claimed in claim 2 wherein said composite structure constitutes a floor structure of a vehicle.

4. The stress-bearing assembly as claimed in claim 3 wherein said at least one closed loop structure comprises at least two said closed loop structures comprising magnesium and serving as a portion of a vehicle passenger compartment.

5. The stress-bearing assembly as claimed in claim 4 further including a roof panel comprising a composite laminate resin-cured panel comprising at least one pair of oriented fiber mats separated by a layer of foamed plastic extending over and between said at least two closed loop structures.

6. The stress-bearing assembly as claimed in claim 4 or 5 further including a door structure comprising an inner frame comprising magnesium and an outer panel, said door structure forming a portion of said passenger compartment.

7. The stress-bearing assembly as claimed in claim 6 wherein said outer panel of said door structure comprises a composite comprising an inner layer of fiber-reinforced plastic and an outer layer of metal foil bonded to said inner layer.

8. The stress-bearing assembly as claimed in claim 7 wherein said outer layer of metal foil comprises a metal selected from the group consisting of steel and aluminum.

9. The stress-bearing assembly as claimed in claim 3 further including a body panel comprising a sheet of metal, and a liner of fiber reinforced plastic attached to said sheet of metal at at least one discrete point, said liner serving as both a strengthening element and a sound absorbing element.

10. The stress-bearing assembly as claimed in claim 3 further including a suspension assembly comprising a subframe and a generally omega-shaped composite spring and wheel location member.

11. The stress-bearing assembly as claimed in claim 10 wherein said spring and wheel location member is pivotably attached to said subframe at a pair of pivot locations, each of said pair of pivot locations being immediately adjacent to a front wheel.

12. The stress-bearing assembly as claimed in claim 11 wherein said spring and wheel location member is resiliently supported by said subframe at at least one location substantially equidistant from said pair of pivot locations.

13. The stress-bearing assembly as claimed in claim 3 or 12 further including a rear suspension assembly comprising a composite spring and wheel location member.

* * * * *